United States Patent
Balin et al.

(10) Patent No.: US 12,388,812 B2
(45) Date of Patent: Aug. 12, 2025

(54) DISTRIBUTION OF DATA IN CLUSTERS OF DEVICES

(71) Applicant: Dell Products L.P., Round Rock, TX (US)

(72) Inventors: Maxim Balin, Gan-Yavne (IL); Efi Levi, Beer Sheva (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 18/459,105

(22) Filed: Aug. 31, 2023

(65) Prior Publication Data

US 2025/0080524 A1    Mar. 6, 2025

(51) Int. Cl.
*H04L 9/40* (2022.01)

(52) U.S. Cl.
CPC ........ *H04L 63/083* (2013.01); *H04L 63/0428* (2013.01)

(58) Field of Classification Search
CPC .......................... H04L 63/083; H04L 63/0428
See application file for complete search history.

(56) References Cited

U.S. PATENT DOCUMENTS

| | | | |
|---|---|---|---|
| 2010/0162383 A1* | 6/2010 | Linden ................ | G06F 11/2028 726/13 |
| 2019/0260733 A1* | 8/2019 | Koranda ............... | H04L 67/146 |
| 2020/0342002 A1* | 10/2020 | Ekbom ............... | G06F 16/2329 |
| 2023/0164121 A1* | 5/2023 | Moon .................... | G06F 9/546 726/26 |

FOREIGN PATENT DOCUMENTS

WO    WO-2019148050 A1 *    8/2019    ............. G06F 21/10

* cited by examiner

*Primary Examiner* — Sm A Rahman
(74) *Attorney, Agent, or Firm* — WOMBLE BOND DICKINSON (US) LLP

(57) ABSTRACT

Methods and systems for managing operation of endpoint devices are disclosed. To manage the operation of endpoint devices, clusters of endpoint devices may be established. The members of the cluster may utilize synchronized data across the cluster to provide various computer implemented services. To synchronize the synchronized data, updates made to local copies of the synchronized data may be distributed to maintain synchronization of other copies of the synchronized data. By doing so, different members of the cluster may have access to synchronized data.

20 Claims, 7 Drawing Sheets

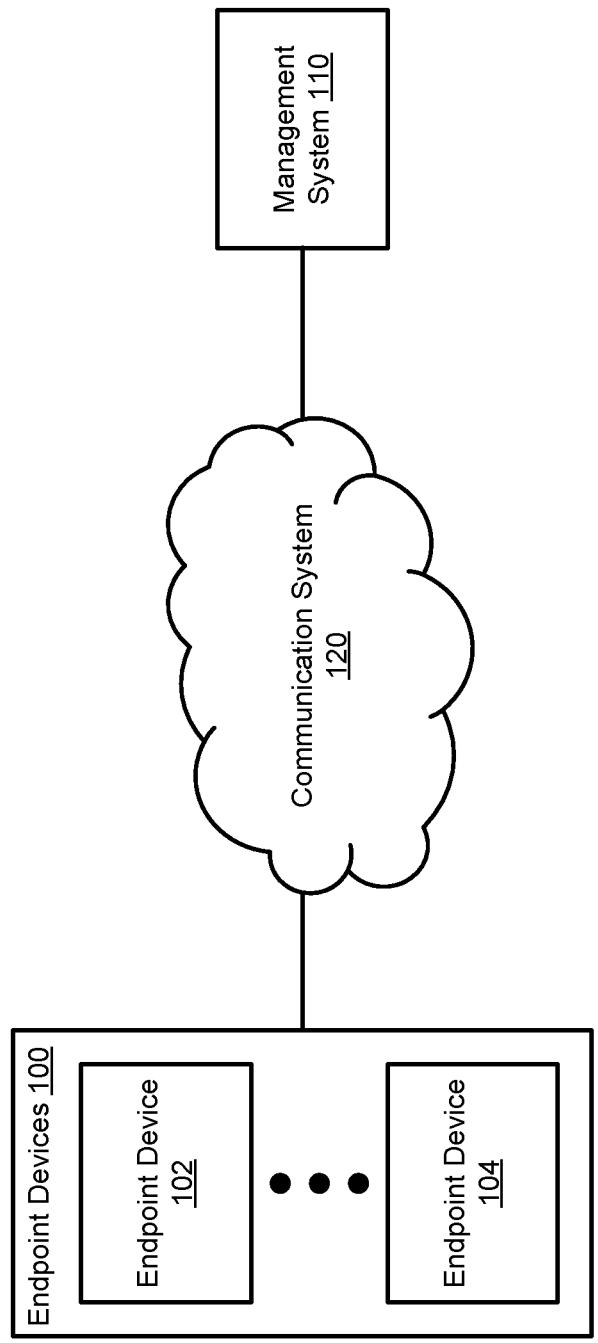

DISTRIBUTION OF DATA IN CLUSTERS OF DEVICES

FIELD

Embodiments disclosed herein relate generally to device management. More particularly, embodiments disclosed herein relate to management of clustering of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

DETAILED DESCRIPTION

Figure 1B:
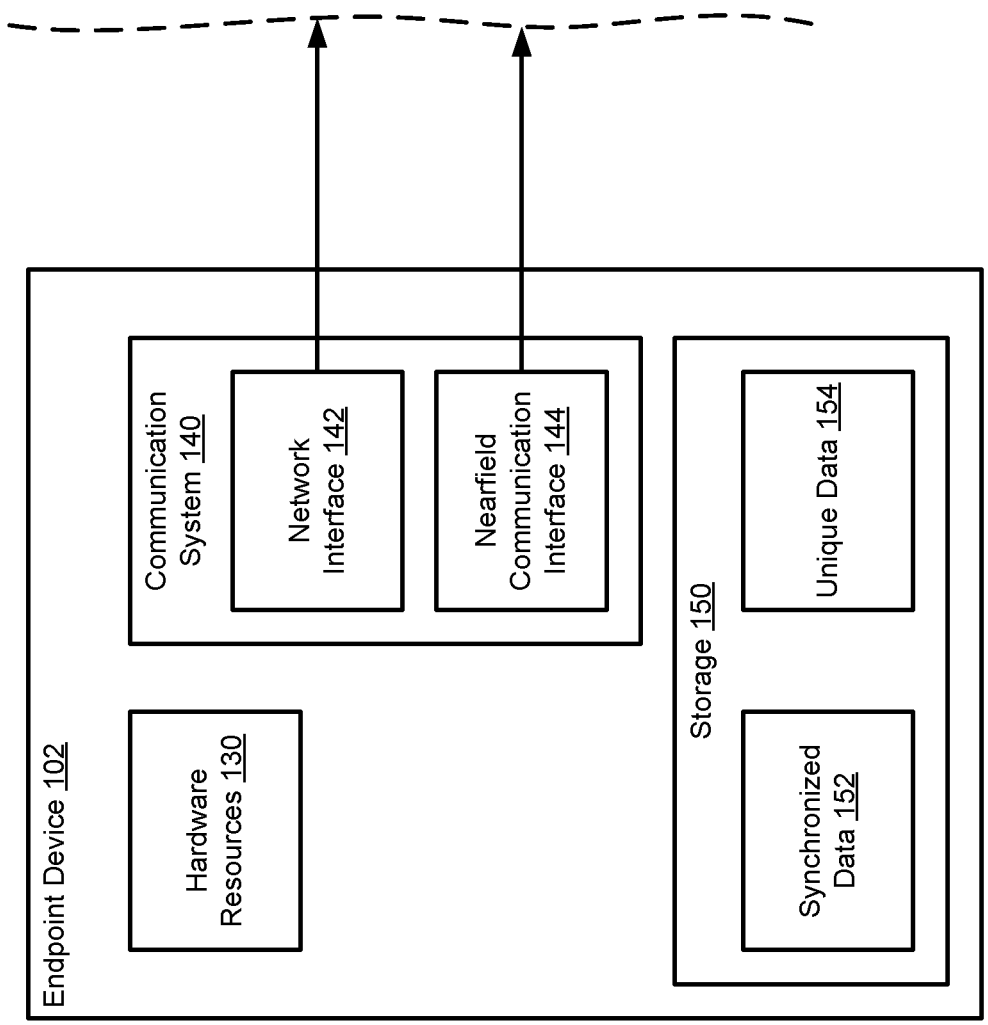
FIG. 1B shows a block diagram illustrating an endpoint device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the operation of clusters of devices. To manage the operation of the clustered devices, each of the clustered devices may maintain synchronized data used to provide computer implemented services. Members of the cluster may independently modify the synchronized data.

To maintain synchronization of the synchronized data, updates reflecting changes made to local copies of the synchronized data may be distributed to members of the cluster. When distributed, the updates may be transmitted over nearfield communication links. The nearfield communication links may be wireless links that utilized lower power levels, and limited range transmission to limit the range over which the communications transmitted over the wireless links may be made. Consequently, the updates transmitted over the nearfield communication links may be less likely to be intercepted or otherwise utilized by entities that are not authorized to obtain the updates.

In addition to being transmitted over the nearfield communication links, multiple mechanisms may be used to secure and verify the integrity of transmission of the updates. For example, data transmitted over the nearfield links may be encrypted, security data may be provided along with the updates to facilitate verification of the authenticity of the updates, etc.

By doing so, embodiments disclosed herein may improve the likelihood of synchronized data being available to members of a cluster while reducing the risk of undesired distribution of the synchronized data.

Thus, embodiments disclosed herein may address, among other technical problems, the technical problem of security in distributed systems. By distributed synchronized data using these links and mechanisms, the synchronized data may be less likely to be access by unauthorized entities during synchronization of the synchronized data across a cluster.

In an embodiment, a method for managing operation of an endpoint device is provided. The method may include identifying a change in a local copy of synchronized data; obtaining a delta update based on the change in the local copy of the synchronized data; identifying members of a cluster of which the endpoint device is a member; distributing a copy of the delta update to at least one of the members using a nearfield link to maintain synchronization of the synchronized data cross the cluster; identifying a portion of unsynchronized data; and providing a copy of the unsynchronized data to another endpoint device using a network link distinct from the nearfield link.

The nearfield link may be a point to point clink between the endpoint device and the at least one of the members.

The endpoint device may be adapted to maintain the synchronization of the synchronized data using nearfield communications rather than network communications.

The method may also include distributing a security token along with the copy of the delta update, the security token being signed using a private key trusted by the at least one of the members.

Distributing the copy of the delta update may include establishing a data transaction for the delta update to track the distributing of the copy of the delta update; and updating the data transactions as portion of the delta update are confirmed as received by the at least one of the members.

Distributing the copy of the delta update may include adding a portion of error correction data to a message comprising the delta update; and transmitting the message to the at least one of the members via the nearfield link.

Distributing the copy of the delta update may also include encrypting the message prior to transmitting the message.

The method may further include obtaining a second delta update from a first member of the members; identifying that a second member of the members has not received the second delta update; and forwarding the second delta update to the second member using the nearfield link.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system include endpoint devices 100. Each endpoint device (e.g., 102, 104) may provide similar and/or different computer implemented services, and may provide the computer implemented services independently and/or in cooperation with other endpoint devices.

To provide the services, portions of endpoint devices 100 may be organized into clusters. While organized in clusters, the members of the clusters may need to synchronize data with other members of the clusters. The endpoint devices may use the synchronized data to cooperatively provide the computer implemented services, to manage the operation of the cluster, and/or for other purposes.

If the member endpoint devices of a cluster are unable to synchronize some data, then the cluster may be impaired. For example, the cluster may be less able to manage itself, various services that rely on having access to the synchronized data may lack access, and/or other problems may occur.

Additionally, if malicious data is integrated into the synchronized data, the services provided by the cluster may be compromised. For example, the malicious data may cause the cluster to operate abnormally. The malicious data may be integrated, for example, through identity spoofing by a malicious device.

Further, the synchronized data may include sensitive portions. Consequently, if the portions of the synchronized data are obtained by unauthorized entities, the sensitive data may be used in undesired manners.

In general, embodiments disclosed herein may provide methods, systems, and/or devices for securing synchronized. To secure the synchronized data, updates for the synchronized data may be distributed in accordance with a security model. The security model may restrict the manner in which the updates may be distributed. For example, the security model may require (i) that any updates distributed via wireless communications do so only using range limited wireless communications such as near field communications, (ii) that updates be authenticated before being used to update the synchronized data, (iii) that the updates be encrypted while in flight, and (iv) that the updates be distributed with integrity data usable to validate the integrity of the updates. By doing so, a system in accordance with an embodiment may be less likely to be compromised due to synchronization of synchronized data. Accordingly, an endpoint device in accordance with an embodiment disclosed herein may be more likely to successfully operate as a part of a cluster due to a higher likelihood of having access to synchronized data for the cluster.

To provide the above noted functionality, the system of FIG. 1A may include endpoint devices 100 and management system 110. Each of these components is discussed below.

Figure 1C:
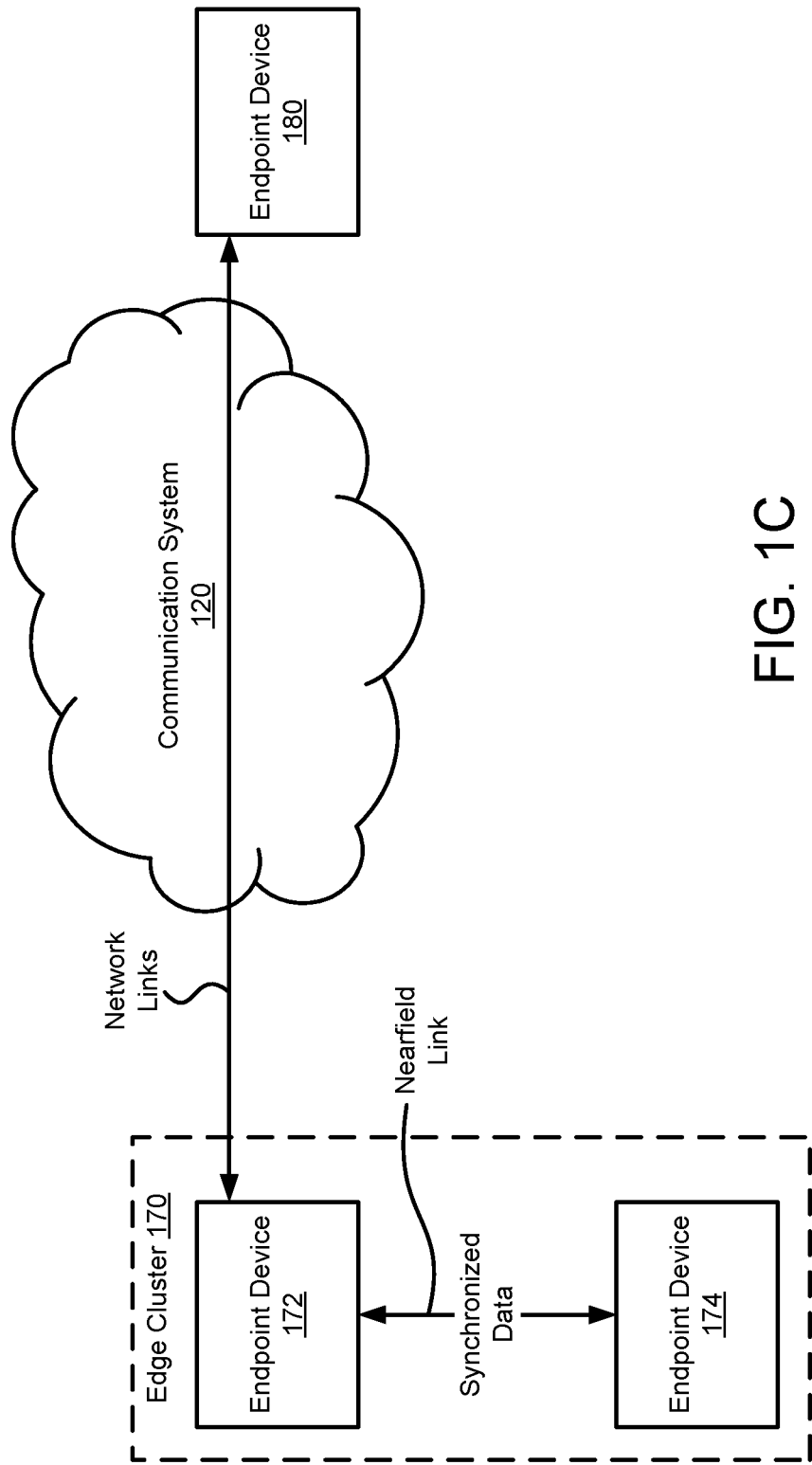
FIG. 1C shows a block diagram illustrating an example system in accordance with an embodiment.
Figure 2A:
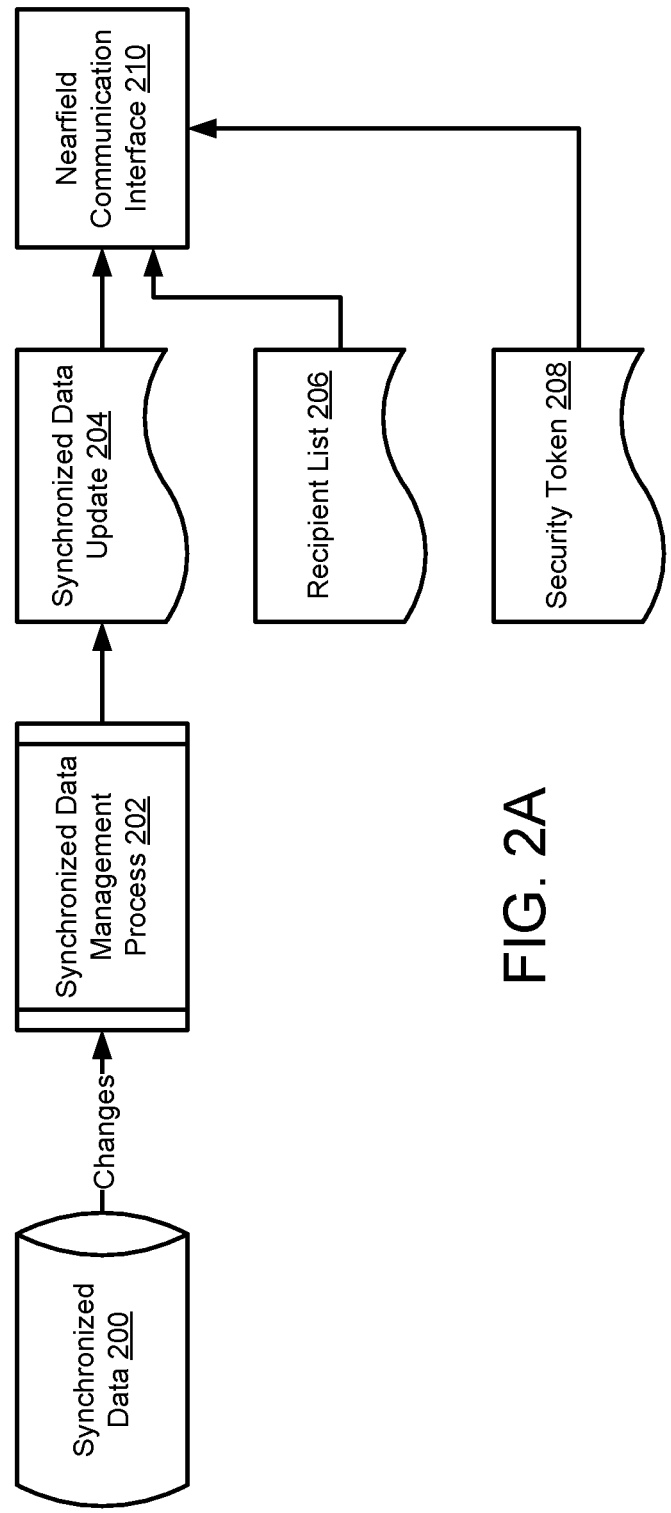
FIGS. 2A-2B show data flow diagrams in accordance with an embodiment.
Figure 2B:
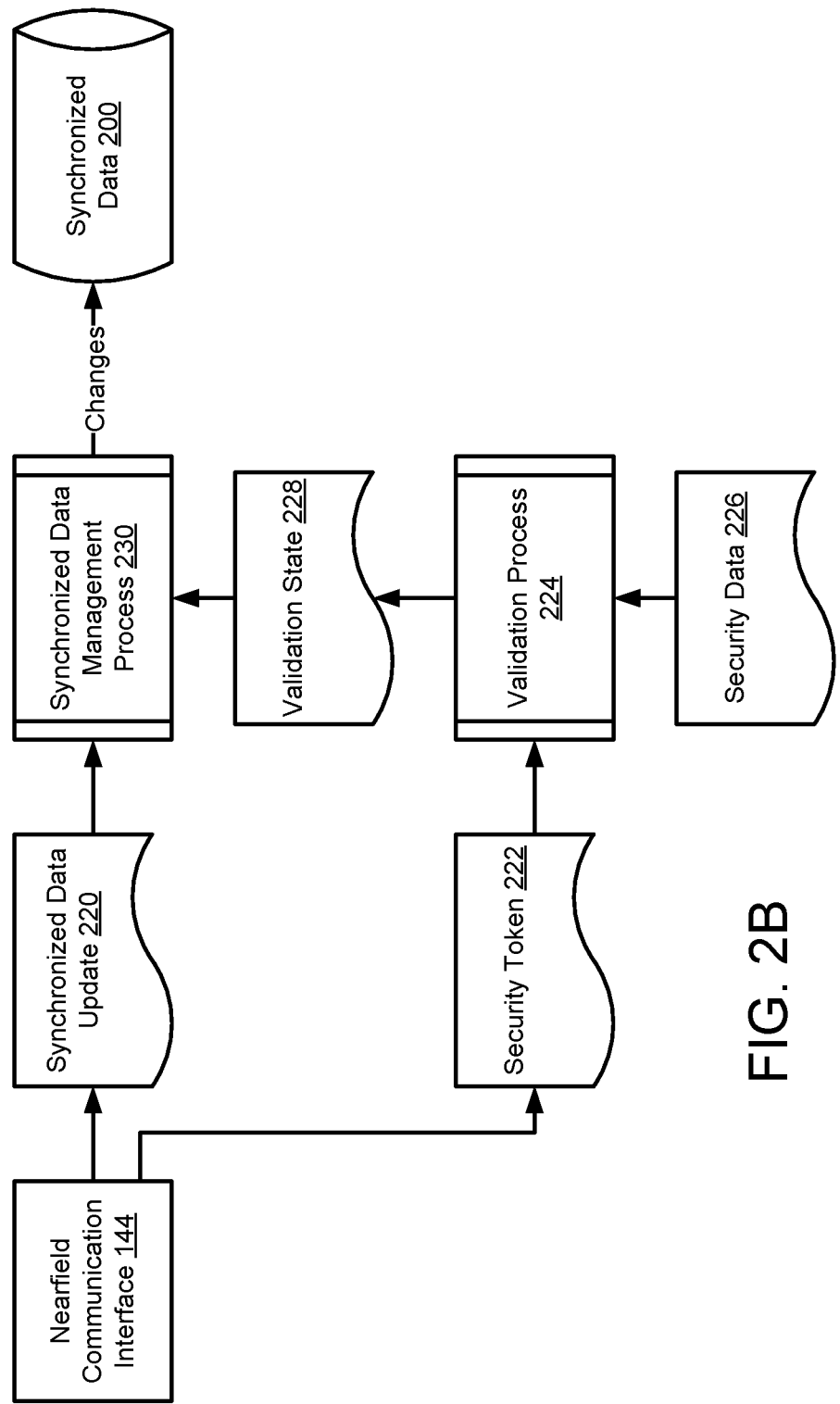

Endpoint devices 100 may provide computer implemented services that may be secured using the security model. To provide the computer implemented services, an endpoint device may (i) maintain synchronization of using a nearfield communications, (ii) transmit non-synchronized data using network links, and (iii) use the synchronized data to operate as a member of a cluster. Refer to FIGS. 1B-1C for additional details regarding endpoint devices 100. Refer to FIGS. 2A-2B for additional details regarding the operation of endpoint devices 100.

Management system 110 may manage the operation of clusters of endpoint devices 100. To do so, management system 110 may (i) identify services to be provided by the clusters, and (ii) instruct the clusters to operate in a manner through which the services are provided.

Figure 3:
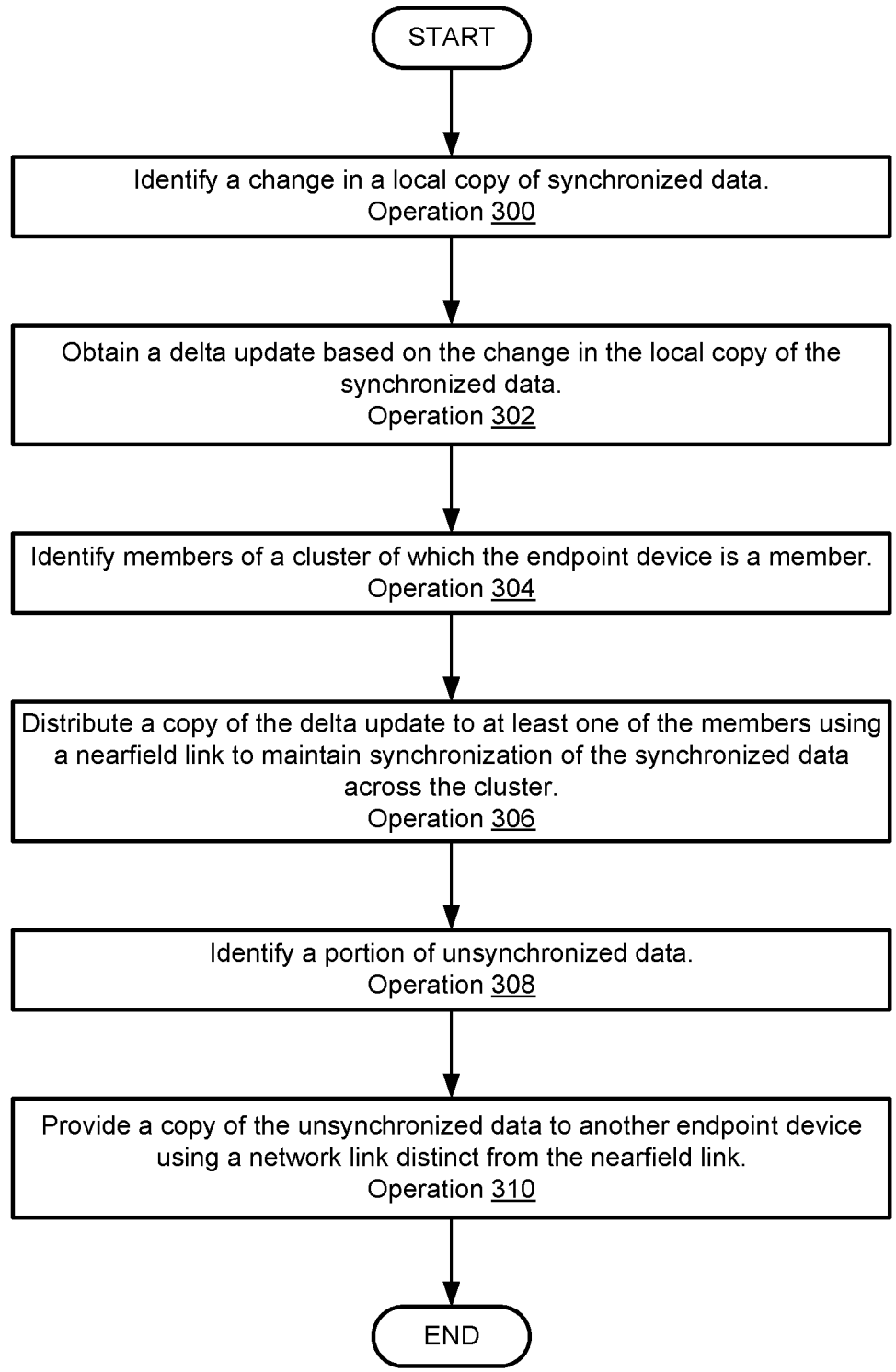
FIG. 3 shows a flow diagram illustrating method in accordance with an embodiment.

When providing their functionality, any of (and/or components thereof) endpoint devices 100 and/or management system 110 may perform all, or a portion, of the method illustrated in FIG. 3.

Any of (and/or components thereof) endpoint devices 100 and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While not shown in FIG. 1A, any of endpoint devices 100 may also be operably connected to other endpoint devices via nearfield communication links. Thus, some endpoint devices may communication with other endpoint devices via the nearfield communication links, so long as the endpoint devices are within the range limits of the nearfield communication links. Refer to FIGS. 1B-1C for additional details regarding nearfield communication links.

While illustrated in FIG. 1A as including a limited number of specific components, a system in accordance with an embodiment may include fewer, additional, and/or different components than those components illustrated therein.

Turning to FIG. 1B, a diagram of endpoint device 102 in accordance with an embodiment is shown. Any of endpoint devices 100 may be similar to endpoint device 102.

To provide computer implemented services, endpoint device 102 may include hardware resources 130, communication system 140, and storage 150.

Hardware resources 130 may include, for example, processors, memory modules, and/or other components that facilitate execution of software instructions. When the software instructions are executed, various computer implemented services may be provided by endpoint device 102. As part of the computer implemented services, various data may be stored in storage 150.

Storage 150 may include storage devices (e.g., hard disk drives, solid state drives, etc.) and/or other types of devices for storing data. Storage 150 may include synchronized data 152 and unique data 154.

To operate as part of a cluster, various portions of data may be synchronized across the members of the cluster. To synchronize the data, various portions of data may be exchanged and stored as part of synchronized data 152. Any member of a cluster may add to and/or modify synchronized data 152.

When additions to and/or changes to synchronized data 152 are made, a management entity hosted by hardware resources 130 may identify the change the distribute information regarding the changes to other members of the cluster. When doing so, the security model discussed with respect to FIG. 1A may be enforced.

To enforce the security model: (i) the information regarded the changes may be encrypted, (ii) integrity data such as error correction bits may be added to one or more messages used to transmit the information to other devices, (iii) a security token or other type of cryptographic data structure may be added to the messages used to transmit the information, and (iv) the messages may be sent via nearfield communication interface 144.

During operation of endpoint device 102, unique data 154 (e.g., non-synchronized data) may be generated and used for various purposes. In contrast to synchronized data 152, unique data 154 may not by synchronized across the cluster of which endpoint device 102 is a member.

When provided to other entities, unique data 154 may be added to messages and transmitted via network interface 142.

Communication system 140 may facilitate (i) generation of messages, (ii) cryptographic encryption of data included in messages, (iii) error correction for messages, (iv) transactional verification of transmission of various portions of data, and/or (v) selective transmission of data over conventional wired and/or wireless networks or nearfield communications. For example, communication system 140 may include various communication chips sets adapted to (i) generate messages compliant with transmission control protocol/internet protocol (TCP/IP) communications and transit the generated messages via compliant networks, and (ii) generate message compliant with nearfield communication protocols and transmit the messages via nearfield links.

For example, using a first chipset communication system 140 may include network interface 142 through which data may be encoded in TCP/IP compliant messages and transmitted via networks. In contrast, using a second chipset communication system 140 may include nearfield communication interface 144 through which data may be encoded into nearfield communication protocol (e.g., ISO/IEC 14443 or 18092, GSMA NFC standards, FeliCa, etc.) compliant messages and transmitted via point to point links. The point to point links may have a limited transmission range due to being wireless links operating in accordance with the nearfield communication standards. For example, the transmission range of data over the point to point links may be less than 12 inches, and in some embodiments may be less than 10 centimeters. This reduced transmission range may limit potential attacks on the point to point links by virtue of the proximity required for use of the point to point links.

Nearfield communication interface 144 may also be implemented with a tag or chip that may at least temporarily buffer data while the host endpoint device is in a low power state. Thus, some data may be transmitted and buffered using the tag until the endpoint device resumes a power state in which the data may be processed.

Depending on whether synchronized data 152 or unique data 154 is to be transmitted, various portions of data may be sent via the different interfaces. While described above as being implemented using different chipset, it will be appreciated that a common chipset may be used to implement these interfaces, and/or other interfaces of communication system 140. Refer to FIG. 1C for additional details regarding transmission of data by endpoint device 102.

Turning to FIG. 1C, a diagram illustrating an example cluster in accordance with an embodiment is shown.

As discussed above, any number of endpoint devices may be members of a cluster (e.g., 170) that provides various computer implemented services. For example, edge cluster 170 may be a cluster of endpoint devices (e.g., 172-174) that provides computer implemented services in an edge environment such as a retail business. The computer implemented services may include, for example, inventory management.

To provide the services, the members of edge cluster 170 may need access to a consistent listing of inventory available at the retail location so that that each endpoint device may decide on action that is consistent with the available inventory. To have access to the consistent list of the inventory, edge cluster 170 may synchronize inventory data cross members of the cluster. To maintain synchronization of the synchronized inventory data, as each endpoint device identifies changes in the inventory, updates regarding the synchronized inventory data may be transmitted to one another via nearfield links.

Overtime, information regarding the inventory level may need to be provided to other endpoint devices that are not members of edge cluster 170. To do so, the information may be transmitted over network links between the members of the edge clusters and the other endpoint devices. For example, endpoint device 180 may provide scheduling services for deliveries of inventory, and may select the type and quantity of deliveries to the retail business based on a quantity of a particular stocked item. Information regarding the level of stock of the particular item in the synchronized inventory data may be provided to endpoint device 180 via a network link rather than a nearfield link because endpoint device 180 is not a member of the example edge cluster 170.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 204, 206, etc.) is used to represent data structures, a second set of shapes (e.g., 202, 230, etc.) is used to represent processes performed using and/or that generate data, and a third set of shapes (e.g., 200, etc.) is used to represent large scale data structures such as databases.

Turning to FIG. 2A, a first data flow diagram in accordance with an embodiment is shown. The first data flow diagram may illustrate data used in and data processing performed in outbound synchronization of synchronized data across a cluster.

To maintain synchronization of synchronized data 200, synchronization data management process 202 may be performed. During synchronization data management process 202, changes made to synchronization data 200 (e.g., by an endpoint device) may be identified. For example, as the content of synchronization data 200 is modified, the changes may be tracked and periodically used during synchronization data management process 202 to obtain synchronization data updates (e.g., 204).

Synchronization data update 204 may be a delta updates that specifies changes made to synchronized data 200 that transitioned it from a first state to a second state. Thus, rather than specifying the changed data, the delta update may specify changes that may be applied to an earlier copy of synchronized data 200 to arrive at a more up to date copy. Other endpoint devices of a cluster may use such updates to update their copies of synchronized data to match synchronized data 200.

Once obtained, synchronized data update 204 may be sent to other members of cluster along with security token 208 to establish trust in the synchronized data update.

To do so, synchronized data update 204 may be provided to nearfield communication interface 210 along with recipient list 206 and security token 208.

Recipient list 206 may specify the members of a cluster that are to receive copies of synchronized data update 204. Recipient list 206 may be a list of other members of the cluster. Recipient list 206 may be established when the cluster is established, and updated overtime to reflect current members of the cluster.

Security token 208 may be a cryptographically verifiable data structure usable to establish the trustworthiness of synchronized data update 204 to other members of the cluster. For example, security token 208 may be a data structure signed using a trusted key. Security token 208 may also include time data (e.g., a time stamp) to reduce the risk of replay attacks or other undesired uses of security tokens.

When obtained by nearfield communication interface 210, various nearfield data units may be generated and sent to corresponding nearfield communication interfaces of other members of the cluster. The structure of each nearfield data unit may comply with a communication protocol, or other schema. The nearfield data units may (i) include portions of synchronized data update 204, (ii) may be encrypted using a session key or other type of key usable by pairs of endpoint devices to encrypt and decrypt data, (iii) may include integrity data such as error correction data usable to ascertain whether transmission errors have occurred and/or correct the transmission errors (e.g., bit flips, exchanges, etc.), and (iv) may be transmitted as part of a managed data transaction.

For example, when sent as part of a managed data transaction, nearfield communication interface 210 may notify the receiver of the nearfield data units that include data that is part of the transaction, and may verify receipt of each of the data units that is part of the transaction. Consequently, both the sender and receiver may establish an auditable log of data transmitted over the nearfield communication interface. In this manner, the integrity of synchronized data 200 may be more likely to be maintained (e.g., by reducing the likelihood of incomplete delta updates being obtained).

Turning to FIG. 2B, a second data flow diagram in accordance with an embodiment is shown. The second data flow diagram may illustrate data used in and data processing performed in inbound synchronization of synchronized data across a cluster.

When synchronization updates (e.g., 220) are obtained by an endpoint device via nearfield communication interface 144, the integrity of the update may be validated through the managed data transaction, errors due to transmission may be identified and/or corrected using error correction data, security token 222 may be extracted and used to determine whether to trusted synchronization data update 220, and (if trusted) synchronization data update 220 may be used to return resynchronize synchronized data 200 (e.g., with respect to other copies of synchronized data 200 that may have been modified by other endpoint devices).

To ascertain whether to trust synchronized data update 220, validation process 224 may be performed. During validation process 224, the signature of security token 222 may check using security data 226. For example, security data 226 may include a key usable to ascertain whether security token 222 was signed using a trusted key.

Additionally, time data and/or other data included in security token 222 may be used to determine whether to trust synchronized data update 220. For example, a timestamp or other time related data may be compared to when the nearfield data units were received by nearfield communication interface 144.

If the signature shows that a trusted key was used to sign security token 222, and the other data in security token 222 indicates that synchronized data update 220 is authentic, then a validation state (e.g., 228) for synchronized data update 220 may be set as validated, as opposed to invalid.

Once validation state 228 is established, synchronized data management process 230 may use validation state 228 to decide whether to apply the changes specified by synchronized data update 220 to synchronized data 200. If synchronized data update 220 is believed to be authentic, then the changes may be applied. For example, synchronized data may be modified as specified by the update. Accordingly, synchronized data 200 may be updated to reflect the changes made by other endpoint devices of a cluster.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows shown in FIGS. 2A-2B, synchronized data 200 may be updated for consistency with changes made to other copies of synchronized data 200 maintained by other endpoint devices of a cluster.

As discussed above, the components of FIG. 1A may perform various methods to manage the operation of endpoint devices. FIG. 3 illustrates a method that may be performed by the components of the system of FIG. 1A. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing data of an endpoint device in accordance with an embodiment is shown. The method may be performed by any of endpoint devices 100, management system 110, and/or other components of the system shown in FIG. 1A.

Prior to operation 300, an endpoint device may be added as a member of the cluster. The cluster may establish security data such as security token, trusted keys, and/or other types of security data usable to confirm whether to trust communications and data is trustworthy. Additionally, information regarding members of the cluster may be provided to the members of the cluster. The information may include identities, network address information, nearfield address information, and/or other types of information usable for the members of the cluster to cooperate with one another through communication.

At operation 300, a change in a local copy of synchronized data is identified. The synchronized data may be synchronized across the cluster by propagating changes to local copies to members of the cluster. The change may be identified by monitoring the local copy of the synchronized data for changes. The local copy of the synchronized data may be stored and maintained by one of the endpoints of the cluster.

At operation 302, a delta update is obtained based on the change in the local copy of the synchronized data. The delta update may be obtained by identifying a difference between the synchronized data before and after the change, and adding information regarding the difference to the delta update. When applied to a different copy of the synchronization data, the same changes that gave rise to the change may be made to the different copy. The difference may be a bit-wise difference, and the bit-wise difference may be compressed or otherwise reduced in size for transmission (e.g., for small changes, a majority of the bits may be 0 indicating no change to the bit due to the change, thereby allowing for large compression ratios to be achieved). Other data reduction techniques other than compression may be used to reduce the size of the resulting delta update.

At operation 304, members of a cluster of which the endpoint device is a member are identified. The members may be identified, for example, by reading a list from storage, by receiving a list from another device, and/or via other methods.

At operation 306, a copy of the delta update is distributed to at least one of the members using a nearfield link to maintain synchronization of the synchronized data across the cluster. The delta update may be distributed by sending the delta update to the at least one of the members via the nearfield link. The delta update may be sent by providing the delta update to a communication system. The communication system may identify that the delta update is to be transmitted to the at least one of the members using the nearfield link based on the type of the data (i.e., that it is synchronized data). Consequently, the communication system may preferentially send the delta update over the nearfield link.

Prior to transmission, the delta update may be encrypted (e.g., using a session key or other type of cryptographic data used to secure wireless communications).

Prior to transmission, verification data such as a security token may be added to one or more messages that include portions of and/or otherwise are used to transmit the delta update.

Prior to transmission, integrity data such as error correction bits may be added to the one or more messages.

Prior to transmission, a data transaction with the at least one of the members may be established to audit the transmission of the delta update. The data transaction may be established by providing an identifier for the transaction, information regarding the content of the transaction, information regarding nearfield data units that will be used to transmit data as part of the transaction, and/or other information usable to track completion of the data transaction. The data transaction may be used to monitor progress of transmission of the delta update, and verify completion of the transmission.

At operation 308, a portion of unsynchronized data is identified. The portion may be identified based on a request from another endpoint device.

At operation 310, a copy of the unsynchronized data is provided to the other endpoint device using a network link that is distinct from the nearfield link. The copy of the unsynchronized data may be providing by sending the copy of the unsynchronized data to the requestor via the network link. The copy of the unsynchronized data may be sent by providing the copy of the unsynchronized data to the communication system. The communication system may identify that the copy of the unsynchronized data is to be transmitted to the requestor using the network link based on the type of the data (i.e., that it is unsynchronized data). Consequently, the communication system may preferentially send the copy of the unsynchronized data over the network link.

The method may end following operation 310.

Additionally, overtime, the endpoint device may receive delta updates from other network devices. If the delta update has not been distributed to some members of the cluster, in addition to processing the delta update, the endpoint device may forward the received delta updates to these members of the cluster.

Thus, using the method illustrated in FIG. 3, synchronized data may be distributed to members of a cluster using nearfield links. By using nearfield links, the distributed data may be less likely to be intercepted by and/or otherwise used by malicious entities.

Figure 4:
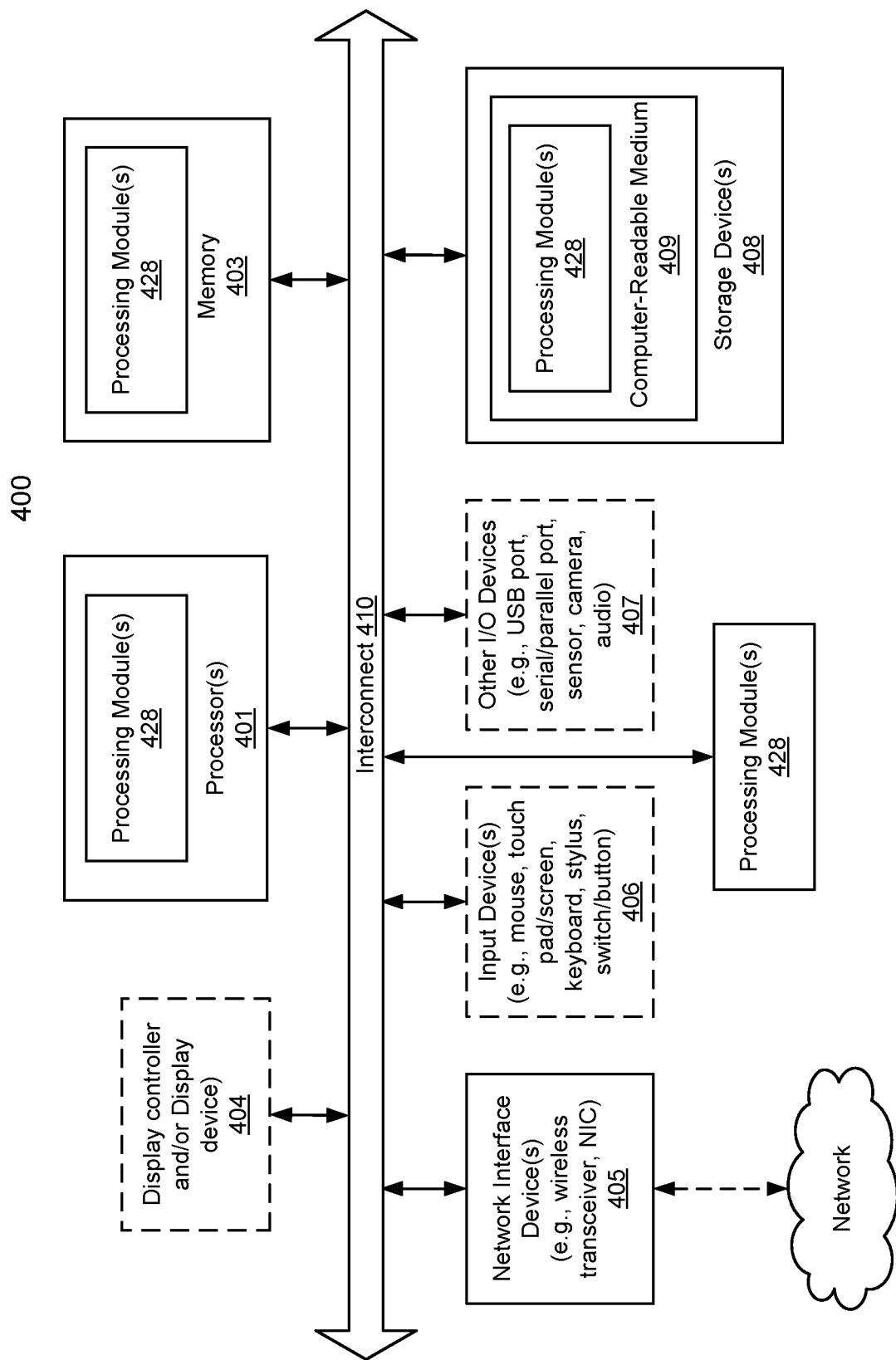
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device, the method comprising:
   identifying a change in a local copy of synchronized data;
   obtaining a delta update based on the change in the local copy of the synchronized data;
   identifying members of a cluster of which the endpoint device is a member, the endpoint device being configured to maintain data synchronization of the synchronized data with all other ones of the members of the cluster;
   distributing a copy of the delta update to at least one of the members using a nearfield link associated with a nearfield communication interface of the endpoint device to maintain the data synchronization of the synchronized data across the members of the cluster;
   identifying a portion of unsynchronized data, a portion of the unsynchronized data being identical to a portion of the synchronized data, the unsynchronized data being data stored by the endpoint device that will be provided by the endpoint device to non-members of the cluster; and
   providing a copy of the unsynchronized data to another endpoint device using a network interface of the endpoint device instead of the nearfield communication interface that is separate and distinct from the network interface, the another endpoint device not being one of the non-members of the cluster, and the endpoint device is not configured to maintain the data synchronization of the synchronized data with the another endpoint device.

2. The method of claim 1, wherein the nearfield link is a point to point link between the endpoint device and the at least one of the members.

3. The method of claim 2, wherein the endpoint device is adapted to maintain the synchronization of the synchronized data with the members of the cluster using the nearfield link rather than using network links associated with the network interface.

4. The method of claim 1, further comprising:
distributing a security token along with the copy of the delta update, the security token being signed using a private key trusted by the at least one of the members.

5. The method of claim 1, wherein distributing the copy of the delta update comprises:
establishing a data transaction for the delta update to track the distributing of the copy of the delta update; and
updating the data transactions as portion of the delta update are confirmed as received by the at least one of the members.

6. The method of claim 1, wherein distributing the copy of the delta update comprises:
adding a portion of error correction data to a message comprising the delta update; and
transmitting the message to the at least one of the members via the nearfield link.

7. The method of claim 6, wherein distributing the copy of the delta update further comprises:
encrypting the message prior to transmitting the message.

8. The method of claim 1, further comprising:
obtaining a second delta update from a first member of the members;
identifying that a second member of the members has not received the second delta update; and
forwarding the second delta update to the second member using the nearfield link.

9. A non-transitory machine-readable medium having instructions stored therein, which when executed by at least one processor, cause a system to perform system first operations for operation of an endpoint device, the first operations comprising:
identifying a change in a local copy of synchronized data;
obtaining a delta update based on the change in the local copy of the synchronized data;
identifying members of a cluster of which the endpoint device is a member, the endpoint device being configured to maintain data synchronization of the synchronized data with all other ones of the members of the cluster;
distributing a copy of the delta update to at least one of the members using a nearfield link associated with a nearfield communication interface of the endpoint device to maintain the data synchronization of the synchronized data across the members of the cluster;
identifying a portion of unsynchronized data, a portion of the unsynchronized data being identical to a portion of the synchronized data, the unsynchronized data being data stored by the endpoint device that will be provided by the endpoint device to non-members of the cluster; and
providing a copy of the unsynchronized data to another endpoint device using a network interface of the endpoint device instead of the nearfield communication interface that is separate and distinct from the network interface, the another endpoint device not being one of the non-members of the cluster, and the endpoint device is not configured to maintain the data synchronization of the synchronized data with the another endpoint device.

10. The non-transitory machine-readable medium of claim 9, wherein the nearfield link is a point to point link between the endpoint device and the at least one of the members.

11. The non-transitory machine-readable medium of claim 10, wherein the endpoint device is adapted to maintain the synchronization of the synchronized data with the members of the cluster using the nearfield link rather than using network links associated with the network interface.

12. The non-transitory machine-readable medium of claim 9, wherein the operations further comprise:
distributing a security token along with the copy of the delta update, the security token being signed using a private key trusted by the at least one of the members.

13. The non-transitory machine-readable medium of claim 9, wherein distributing the copy of the delta update comprises:
establishing a data transaction for the delta update to track the distributing of the copy of the delta update; and
updating the data transactions as portion of the delta update are confirmed as received by the at least one of the members.

14. The non-transitory machine-readable medium of claim 9, wherein distributing the copy of the delta update comprises:
adding a portion of error correction data to a message comprising the delta update; and
transmitting the message to the at least one of the members via the nearfield link.

15. The non-transitory machine-readable medium of claim 14, wherein distributing the copy of the delta update further comprises:
encrypting the message prior to transmitting the message.

16. The non-transitory machine-readable medium of claim 9, wherein the operations further comprise:
obtaining a second delta update from a first member of the members;
identifying that a second member of the members has not received the second delta update; and
forwarding the second delta update to the second member using the nearfield link.

17. An endpoint device, comprising:
a processor; and
a memory coupled to the processor to store instructions, which when executed by the processor, cause the endpoint device to perform operations for managing operation of the endpoint device, the operations comprising:
identifying a change in a local copy of synchronized data;
obtaining a delta update based on the change in the local copy of the synchronized data;
identifying members of a cluster of which the endpoint device is a member, the endpoint device being configured to maintain data synchronization of the synchronized data with all other ones of the members of the cluster;
distributing a copy of the delta update to at least one of the members using a nearfield link associated with a nearfield communication interface of the endpoint device to maintain the data synchronization of the synchronized data across the members of the cluster;

identifying a portion of unsynchronized data, a portion of the unsynchronized data being identical to a portion of the synchronized data, the unsynchronized data being data stored by the endpoint device that will be provided by the endpoint device to non-members of the cluster; and providing a copy of the unsynchronized data to another endpoint device using a network interface of the endpoint device instead of the nearfield communication interface that is separate and distinct from the network interface, the another endpoint device not being one of the non-members of the cluster, and the endpoint device is not configured to maintain the data synchronization of the synchronized data with the another endpoint device.

18. The endpoint device of claim 17, wherein the nearfield link is a point to point link between the endpoint device and the at least one of the members.

19. The method of claim 1, wherein the at least one of the members to which the copy of the delta update is distributed using the nearfield link is disposed at a same physical location as the endpoint device within a maximum transmission range of the nearfield link.

20. The method of claim 1, wherein the maximum transmission range of the nearfield link is 12 inches.

* * * * *